United States Patent
Yoshimura et al.

(10) Patent No.: US 9,005,834 B2
(45) Date of Patent: Apr. 14, 2015

(54) POLYMER ELECTROLYTE FUEL CELL

(75) Inventors: Mitsuo Yoshimura, Kyoto (JP); Hirokazu Honkawa, Osaka (JP); Kenji Arai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/818,445

(22) PCT Filed: Feb. 10, 2012

(86) PCT No.: PCT/JP2012/000905
§ 371 (c)(1),
(2), (4) Date: Feb. 22, 2013

(87) PCT Pub. No.: WO2012/117676
PCT Pub. Date: Sep. 7, 2012

(65) Prior Publication Data
US 2013/0157160 A1    Jun. 20, 2013

(30) Foreign Application Priority Data

Mar. 2, 2011    (JP) .................................. 2011-044962

(51) Int. Cl.
*H01M 8/04* (2006.01)
*H01M 8/02* (2006.01)
(Continued)

(52) U.S. Cl.
CPC .......... *H01M 8/04007* (2013.01); *H01M 8/241* (2013.01); *H01M 8/0267* (2013.01); *H01M 2008/1095* (2013.01); *Y02E 60/50* (2013.01)

(58) Field of Classification Search
CPC .......... H01M 8/0267; H01M 8/04007; H01M 8/1002; H01M 8/241; H01M 8/04067; Y02E 60/521

USPC ......... 429/433, 434, 437, 439, 456, 457, 458, 429/468, 514, 518
See application file for complete search history.

(56) References Cited

U.S. PATENT DOCUMENTS

2005/0008911 A1    1/2005 Kaye
2005/0014059 A1    1/2005 Kaye
(Continued)

FOREIGN PATENT DOCUMENTS

| JP | 11-354142 | * 12/1999 | .............. H01M 8/02 |
|---|---|---|---|
| JP | 2005-158629 | 6/2005 | |

(Continued)

OTHER PUBLICATIONS

European Office Action issued Mar. 25, 2014 in corresponding European Application No. 12 752 854.5.
(Continued)

*Primary Examiner* — Patrick Ryan
*Assistant Examiner* — Ben Lewis
(74) *Attorney, Agent, or Firm* — Wenderoth, Lind & Ponack, L.L.P.

(57) ABSTRACT

A polymer electrolyte fuel cell comprises a plurality of stacked cells each having an ionic conductive electrolyte membrane, an anode placed on one side of the electrolyte membrane, a cathode placed on the other side of the electrolyte membrane, and a conductive separator on which a first refrigerant channel for flow of a refrigerant is formed in center part thereof. The separator comprises penetration holes constituting a manifold which extend in a direction of stacking of the plurality of cells and through which the refrigerant flows and second refrigerant channels for communication between the penetration holes and the first refrigerant channel. A plurality of protrusions that protrude into the penetration holes from parts of wall surfaces of the penetration holes that are located peripherally in connection parts between the penetration holes and the second refrigerant channels.

5 Claims, 7 Drawing Sheets

(51) Int. Cl.
   *H01M 8/24* (2006.01)
   *H01M 8/10* (2006.01)

(56) References Cited

U.S. PATENT DOCUMENTS

| | | |
|---|---|---|
| 2005/0244700 A1 | 11/2005 | Abd Elhamid et al. |
| 2007/0269703 A1 | 11/2007 | Kaye |
| 2008/0131755 A1 | 6/2008 | Lee et al. |
| 2009/0136805 A1 | 5/2009 | Sato et al. |
| 2009/0202886 A1 | 8/2009 | Kaye |
| 2010/0291453 A1 | 11/2010 | Araki et al. |

FOREIGN PATENT DOCUMENTS

| | | |
|---|---|---|
| JP | 2005-209526 | 8/2005 |
| JP | 2007-87766 | 4/2007 |
| JP | 2007-294123 | 11/2007 |
| JP | 2008-16216 | 1/2008 |
| JP | 2009-302069 | 12/2009 |
| WO | 2005/020346 | 3/2005 |
| WO | 2008/110906 | 9/2008 |

OTHER PUBLICATIONS

International Search Report issued Apr. 10, 2012 in International (PCT) Application No. PCT/JP2012/000905.
Supplementary European Search Report issued Sep. 13, 2013 in corresponding European Application No. Ep 12 75 2854.
International Preliminary Report on Patentability and Written Opinion of the International Searching Authority issued Sep. 12, 2013 in International (PCT) Application No. PCT/JP2011/000905.
Communication pursuant to Article 94(3) EPC issued Sep. 16, 2014 in corresponding European Application No. 12752854.5.
International Preliminary Report on Patentability and Written Opinion of the International Searching Authority issued Sep. 12, 2013 in International (PCT) Application No. PCT/JP2012/000905.

\* cited by examiner

WORKING EXAMPLE 1

*Fig.4B*

COMPARATIVE EXAMPLE

*Fig.4C*

WORKING EXAMPLE 2

POLYMER ELECTROLYTE FUEL CELL

TECHNICAL FIELD

The present invention relates to a fuel cell and particularly relates to a polymer electrolyte fuel cell having a structure for suppressing a deterioration in sealability of seal members that is caused by a current corrosion on separators through the agency of a refrigerant.

BACKGROUND ART

Conventional polymer electrolyte fuel cells concurrently generate electric power and heat by an electrochemical reaction between a fuel gas containing hydrogen and an oxidant gas containing oxygen, such as air, and there are various types thereof according to the fuel for use therein, the constituent material thereof, and the like.

Figure 9:
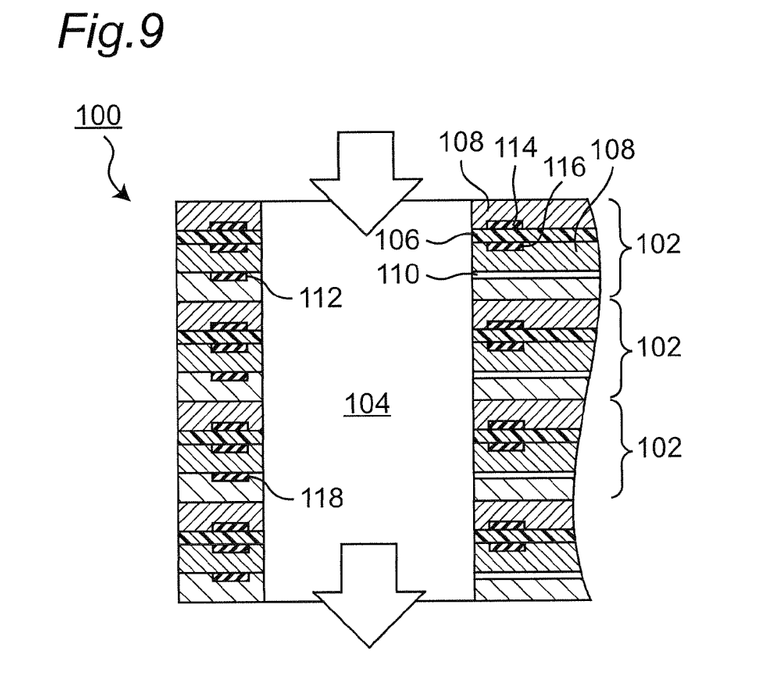
FIG. 9 is a section of a refrigerant manifold of a conventional polymer electrolyte fuel cell.

FIG. 9 is a fragmentary section of a conventional polymer electrolyte fuel cell. The polymer electrolyte fuel cell 100 is a structure having a plurality of stacked cells 102 and has a refrigerant manifold 104 (refrigerant channel) through which a refrigerant recovering the generated heat flows.

The cells 102 each have a polymer electrolyte membrane 106 composed of cation-exchange resin that selectively transports a hydrogen ion and conductive separators 108 placed on both sides of the polymer electrolyte membrane 106. Each cell 102 has an anode joined onto one surface of the polymer electrolyte membrane 106 that faces one of the separators 108 and a cathode joined onto the other surface of the polymer electrolyte membrane 106 that faces the other of the separators 108, though both are not shown. A composition of the polymer electrolyte membrane 106, the anode, and the cathode is referred to as MEA (Membrane Electrode Assembly).

The refrigerant manifold 104 is formed by connecting among penetration holes formed through the polymer electrolyte membranes 106 and the separators 108 of the cells 102. The refrigerant that has flowed through the refrigerant manifold 104 flows into refrigerant channels 110 provided in the cells 102 and recovers heat from the cells 102.

With use of an ionic conductor such as tap water as the refrigerant, a short circuit may occur through the refrigerant between cells 102 spaced apart from each other with one or more cells 102 interposed therebetween (e.g., first cell and third cell from upstream side with respect to a flow direction of the refrigerant that is shown by outline arrows in FIG. 9), and the separators 108 of the cell 102 on high voltage side may thereby deteriorate because of a current corrosion thereon. This is caused by occurrence of an oxidation reaction on interfaces between the cell 102 on the high voltage side and the ionic conductor. On condition that progress of the current corrosion on the separators 108 causes a deterioration of parts of the separators 108 that are in contact with seal members 112 for sealing the refrigerant, there is a possibility that a degradation in the sealability for the refrigerant between the seal members 112 and the separators 108 may cause leakage of the refrigerant to the outside. Similarly, there is a possibility that the short circuit through the refrigerant may cause a degradation in sealability attained by seal members 114, 116 for the fuel gas, the oxidant gas and the like.

As a measure against this problem in a polymer electrolyte fuel cell disclosed in Patent Literature 1, a refrigerant channel is provided so that the length of the channel for refrigerant is prolonged in order to provide the refrigerant with high resistivity.

In a polymer electrolyte fuel cell disclosed in Patent Literature 2, a sacrifice material that is more prone to undergo the current corrosion than separators is provided in a refrigerant channel in a current collector on the high voltage side.

In a polymer electrolyte fuel cell disclosed in Patent Literature 3, a member that is to be at higher potential than the highest-potential cell is provided in a refrigerant channel.

For another measure, pure water can be used as refrigerant.

CITATION LIST

Patent Literature
PTL1: JP2005-158629 A
PTL2: JP2007-87766 A
PTL3: JP2008-16216 A

SUMMARY OF INVENTION

Technical Problem

The refrigerant, however, flows through pipes that are connected to the polymer electrolyte fuel cell and that are made of material such as metal, resin and the like, and thus may have an electric conductivity increased by a dissolution of ion components eluted from the pipes. The electric conductivity of the refrigerant may be increased, while the refrigerant flows through the polymer electrolyte fuel cell, by a dissolution of ion components eluted from members (such as separators) constituting the fuel cell. That is, there is a possibility that the electric conductivity of the refrigerant may increase even with use of pure water as the refrigerant.

Then a possibility exists that the increase in the electric conductivity of the refrigerant may cause the short circuit through the refrigerant between cells spaced apart from each other with one or more cells interposed therebetween and may thereby cause the deterioration of the separators of the cell on the high voltage side with the current corrosion thereon, as described above. This incurs a possibility that the deterioration of parts of the separators in contact with the seal members may cause leakage of the fuel gas, the oxidant gas and the refrigerant, sealed by the seal members, to the outside.

Conceivable as measures against the problems to suppress the increase in the electric conductivity of the refrigerant are eliminating the ion components in the refrigerant, decreasing in concentration the ion components in the refrigerant that results from dilution with pure water, making the polymer electrolyte fuel cell and the pipes from a material of high purity that resists the dissolution of ion components, and the like, whereas any of those involves an increase in costs.

An object of the invention is to provide a polymer electrolyte fuel cell having a structure that suppresses the deterioration in sealability between seal members and separators which may be caused by the current corrosion on the separators through the agency of the refrigerant even in the case of an increase in the electric conductivity of the refrigerant.

Solution to Problem

In order to achieve the object, the invention is configured as follows.

According to an aspect of the invention, there is provided a polymer electrolyte fuel cell comprising a plurality of stacked cells each having an ionic conductive electrolyte membrane, an anode placed on one side of the electrolyte membrane, a cathode placed on the other side of the electrolyte membrane, and a conductive separator on which a first refrigerant channel for flow of a refrigerant is formed in a center part thereof. The separator comprises a refrigerant manifold which extends in a direction of stacking the plurality of cells and through which the refrigerant flows, a second refrigerant channel for communication between the refrigerant manifold and the first refrigerant channel, and a plurality of protrusions protruding into the refrigerant manifold from a part of a wall surface of the refrigerant manifold that is located peripherally in a connection part between the refrigerant manifold and the second refrigerant channel.

Advantageous Effects of Invention

According to the invention, the plurality of protrusions that protrude into the penetration hole are provided on the part of the wall surface of the penetration hole that is located peripherally in the connection part between the penetration hole and the second refrigerant channel, and thus the current corrosion can intensively be caused at the extremities of the protrusions. Accordingly, the current corrosion in parts of the separator that are near to the seal members can be suppressed in comparison with that at the extremities of the protrusions. This suppresses a deterioration in parts of the separator that are in contact with the seal members and suppresses a deterioration in sealability between the seal members and the separator.

BRIEF DESCRIPTION OF DRAWINGS

The above aspects and features of the present invention will become more apparent from the following description of preferred embodiments thereof with reference to the accompanying drawings, and wherein:

FIGS. 2A-2B are sections of a refrigerant manifold according to the embodiment of the invention, where

DESCRIPTION OF EMBODIMENTS

Prior to description on an embodiment in according to the invention, current corrosion on separators through the agency of a refrigerant will initially be described.

Equation 1 is for finding of a resistance of the refrigerant that incurs a short circuit between two cells $B_1$ and $B_n$ (n is an integer of three or greater) spaced apart from each other with cells numbering n-2 interposed therebetween in a polymer electrolyte fuel cell.

$$R = \frac{L}{\rho \times S} \qquad \text{(Equation 1)}$$

wherein R is a resistance of the refrigerant, L is a distance between the two cells $B_1$ and $B_n$, $\rho$ is an electric conductivity of the refrigerant, and S is the cross sectional area of a channel through which the refrigerant flows (e.g., cross sectional area of a manifold).

As shown in Equation 1, the resistance R of the refrigerant is inversely proportional to product of the electric conductivity $\rho$ and the cross sectional area S. On condition that the electric conductivity $\rho$ is large, therefore, the resistance R can be kept at a large value by a decrease in the cross sectional area S.

On condition that tap water having the electric conductivity of about $200\,\mu\Omega^{-1}\mathrm{cm}^{-1}$ is used as the refrigerant, for instance, the cross sectional area of the channel for the refrigerant has only to be about 1/200 that in use of pure water having the electric conductivity of 1 $\mu\Omega^{-1}\mathrm{cm}^{-1}$ or lower as the refrigerant.

When the short circuit occurs between the two cells $B_1$ and $B_n$, a circuit is formed in which a current flows from the cell $B_n$ on the high voltage side through the other cells $B_{n-1}$-$B_2$ to the cell $B_1$ on the low voltage side and in which the current flows from the cell $B_1$ through the refrigerant to the cell $B_n$. Providing that the current flowing through such a circuit is expressed as I, the relation shown by Equation 2 holds.

$$n \times E = E_+ + E_- + I \times R \qquad \text{(Equation 2)}$$

wherein n is number of the cells, E is voltage of each of the cells, $E_+$ is voltage generated between the cell $B_n$ on the high voltage side and the refrigerant, and $E_-$ is the voltage generated between the cell $B_1$ on the low voltage side and the refrigerant.

In such a circuit in which the refrigerant is water and in which the separators of the cells are made from carbon, an oxidation reaction expressed as Chemical Formula 1 occurs between the separators of the cell $B_n$ on the high voltage side and the refrigerant, and an reduction reaction expressed as Chemical Formula 2 occurs between the separators of the cell $B_1$ on the low voltage side and the refrigerant.

$$C + 2H_2O \rightarrow CO_2 + 4H^+ + 4e \qquad \text{(Chemical Formula 1)}$$

$$2H^+ + 2e \rightarrow H_2 \qquad \text{(Chemical Formula 2)}$$

$E_+$ that is shown in Equation 2 and that is equal to or lower than an activation energy for the oxidation reaction expressed as Chemical Formula 1 prevents progress of the oxidation reaction expressed as Chemical Formula 1, whereas an increase in $E_+$ caused by a decrease in the resistance R of the refrigerant brings about the progress of the oxidation reaction expressed as Chemical Formula 1. Then the separators, made from carbon, of the cell $B_n$ on the high voltage side are deteriorated. This similarly occurs on the separators made from metal material, without limitation to the separators made from carbon.

In order to suppress the progress of the oxidation reaction expressed as Chemical Formula 1, accordingly, it is necessary to increase the resistance R of the refrigerant, that is, to achieve at least one of increase in the distance L, decrease in the electric conductivity $\rho$, and decrease in the cross section area S.

It is, however, difficult to change the distance L in order to increase the resistance of the refrigerant because the distance L is determined by demanded output (i.e., number of the cells) of the polymer electrolyte fuel cell.

Conceivable for keeping the electric conductivity ρ of the refrigerant low are eliminating ion components in the refrigerant, decreasing concentration of the ion components in the refrigerant that results from dilution with pure water, making the polymer electrolyte fuel cell and the pipes from material of high purity that resists a dissolution of ion components, and the like, whereas any of those involve an increase in costs.

The decrease in the cross sectional area S causes an increase in influences of pulsation, aeration and the like in a pump for discharging the refrigerant and thereby results in an unstable supply of the refrigerant to cells placed on a downstream side with respect to a flow direction of the refrigerant. As a result, an efficiency of the refrigerant for heat recovery is decreased.

The invention has been produced in consideration of above facts.

Hereinbelow, an embodiment of the invention will be described with reference to the drawings.

Figure 1:
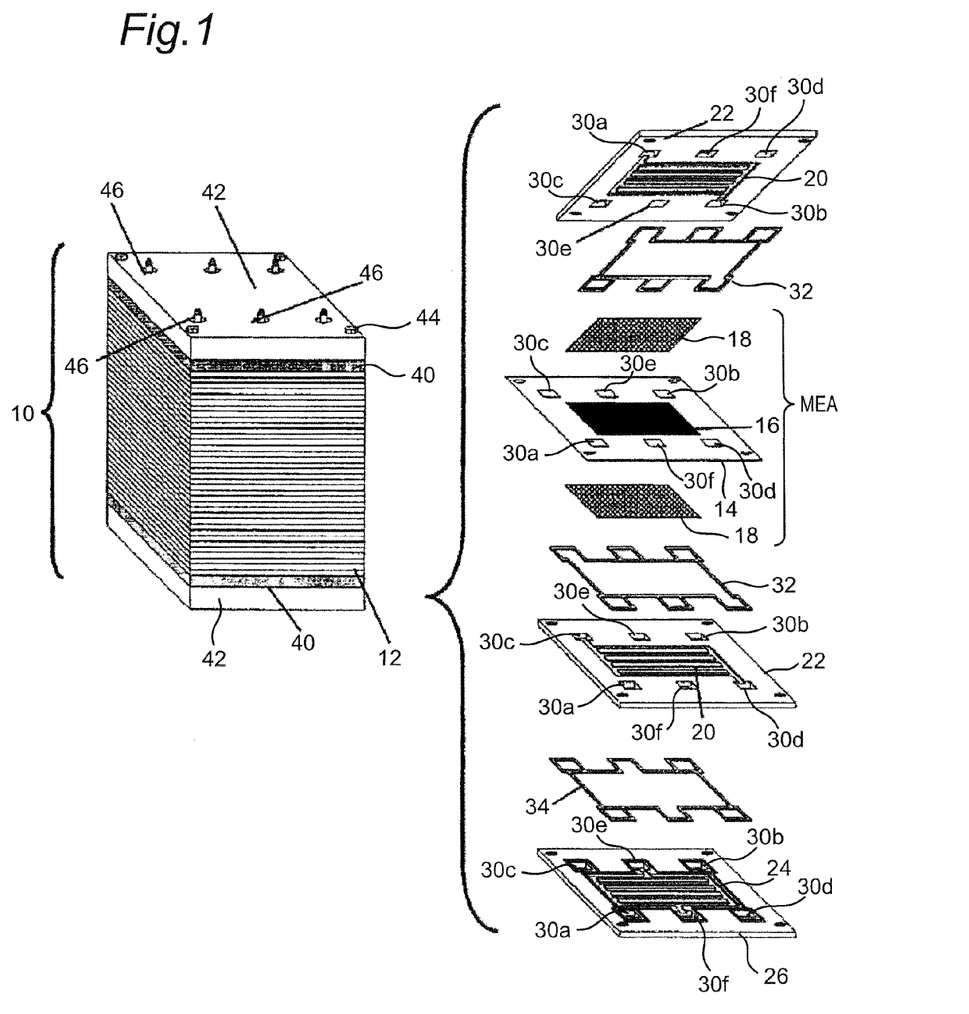
FIG. 1 is a representation for illustration of a configuration of a polymer electrolyte fuel cell according to an embodiment of the invention.

FIG. 1 shows a polymer electrolyte fuel cell in according to an embodiment of the invention and an exploded view of a cell constituting the polymer electrolyte fuel cell.

As shown in FIG. 1, the polymer electrolyte fuel cell 10 is composed of a plurality of stacked cells 12.

The cells 12 each have a polymer electrolyte membrane 14 composed of cation-exchange resin that selectively transports a hydrogen ion. Catalyst layers 16 that principally include carbon powder carrying metal such as platinum with a catalytic activity are formed on both surfaces of the polymer electrolyte membrane 14. Formed on the catalyst layers 16 are gas diffusion layers 18 having a permeability for a reactant gas, such as a fuel gas and an oxidant gas, and an electron conductivity.

An assembly of the polymer electrolyte membrane 14, the catalyst layers 16, and the gas diffusion layers 18 is referred to as an MEA (Membrane Electrode Assembly). A combination of the catalyst layer 16 and the gas diffusion layer 18 that are supplied with the fuel gas is referred to as an anode (fuel electrode), and a combination of the catalyst layer 16 and the gas diffusion layer 18 that are supplied with the oxidant gas is referred to as a cathode (oxygen electrode).

The cell 12 further has separators 22, on which gas channels 20 for supplying the fuel gas to the anode or for supplying the oxidant gas to the cathode are formed on surfaces thereof on side of the MEA, on both sides of the MEA.

The cell 12 further has a separator 26, on which a refrigerant channel (first refrigerant channel) 24 that undergoes flow therethrough of liquid refrigerant such as water and antifreeze for recovering heat generated in electric power generation by the MEA is formed in a center part of a surface on the side of the MEA, on a side opposite to the MEA with respect to the separator 22.

The separators 22, 26 are made from conductive materials such as carbon and metal material.

Penetration holes 30a-30f, that define manifolds when the plurality of cells 12 are stacked, are formed on the polymer electrolyte membrane 14, the two separators 22, and the separators 26.

The penetration holes 30a of the polymer electrolyte membrane 14, the two separators 22, and the separators 26 define a fuel gas supply manifold for supplying the fuel gas into the gas channel 20 formed on one of the separators 22 of each cell 12. The penetration holes 30b define a fuel gas recovery manifold for recovering the fuel gas from the gas channel 20 of each cell 12.

The penetration holes 30c define an oxidant gas supply manifold for supplying the oxidant gas into the gas channel 20 formed on the other of the separators 22 of each cell 12. The penetration holes 30d define an oxidant gas recovery manifold for recovering the oxidant gas from the gas channel 20 of each cell 12.

The penetration holes 30e define a refrigerant supply manifold for supplying the refrigerant into the refrigerant channel 24 formed in the center part of the separator 26 of each cell 12. The penetration holes 30f define a refrigerant recovery manifold for recovering the refrigerant from the refrigerant channel 24 of each cell 12.

Between the polymer electrolyte membrane 14 and the separators 22, additionally, seal members 32 for enclosing and sealing the gas channels 20 and the penetration holes 30a-30d are interposed so as to prevent the fuel gas and the oxidant gas from leaking from the gas channels 20 and the manifolds for the fuel gas and the oxidant gas to outside of the fuel cell 10 or into other manifolds.

Between the separator 22 and the separator 26, furthermore, a seal member 34 for enclosing and sealing the refrigerant channel 24 and the penetration holes 30e and 30f is interposed so as to prevent the refrigerant from leaking from the refrigerant channel 24 and the manifolds for the refrigerant to the outside of the fuel cell 10 or into other manifolds.

The seal members 32, 34 are made from elastic material, e.g., ethylene-propylene-diene rubber (EPDM), fluororubber, silicone rubber, thermoplastic elastomer or the like. In order that the seal members 32, 34 may attain excellent sealability, arithmetical mean deviations Ra of profile of surfaces of the separators 22, 26 and the polymer electrolyte membrane 14 that are in contact with the seal members 32, 34 are preferably 3.2 a or smaller.

The fuel cell 10 is formed by stacking of such cells 12 in a number according to the demanded output. Specifically, the plurality of cells 12 that are stacked so as to be shaped like a block are held through current collectors 40 between end plates 42 and are integrally fixed by bolts 44, so that the fuel cell 10 is produced. Provided on the end plates 42 are a plurality of fluid couplings 46 for supplying or recovering the fuel gas, the oxidant gas and the refrigerant to or from the manifolds.

Figure 2A:
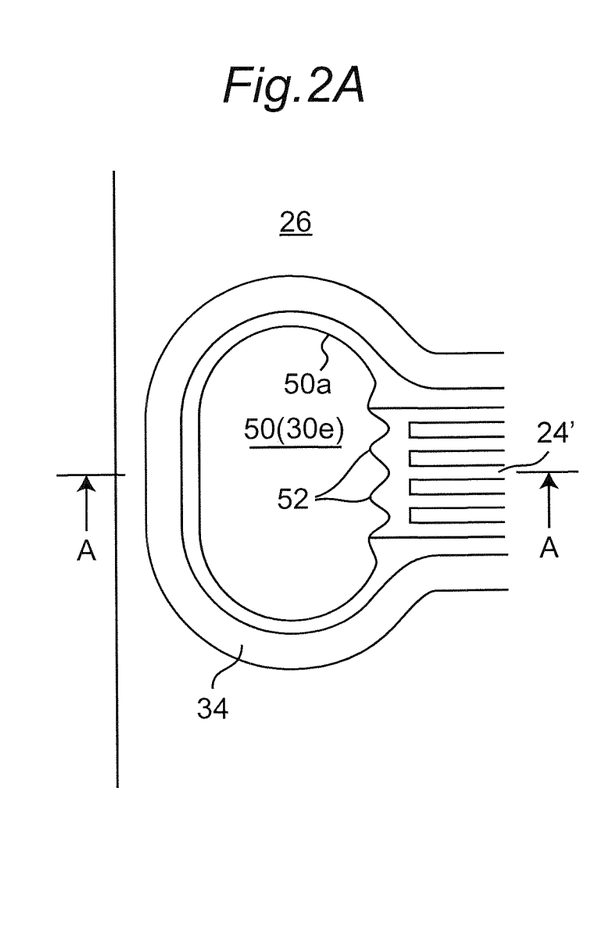
FIG. 2A is a representation showing a section orthogonal to a flow direction of refrigerant.
Figure 2B:
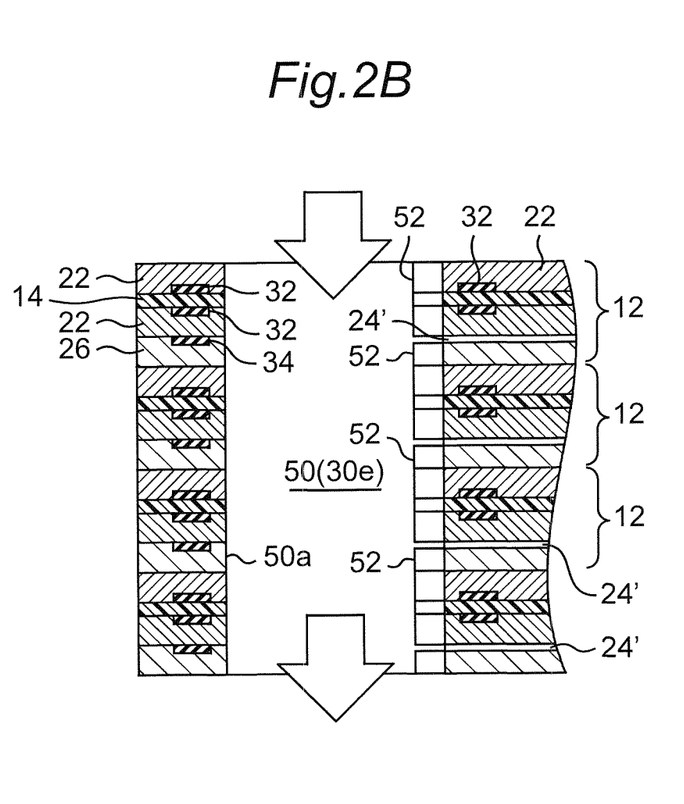
FIG. 2B is a representation showing a section parallel to the flow direction of the refrigerant.

FIG. 2A shows a section of a refrigerant manifold 50 that is orthogonal to a direction of stacking of the cells 12. FIG. 2B shows a section (A-A section in FIG. 2A) of the refrigerant manifold 50 that is parallel to the direction of stacking of the cells 12.

As shown in FIG. 2A, the penetration hole 30e (30f) formed on the separator 26 that defines the refrigerant manifold 50 is connected to a communication channel (second refrigerant channel) 24'. The communication channel 24' is formed on the separator 26 so as to achieve communication between the refrigerant manifold 50 (the penetration hole 30e, 30f) and the refrigerant channel 24 formed in the center part of the separator 26. A plurality of protrusions 52 are provided which protrude into the refrigerant manifold 50 from a part of a wall surface 50a of the refrigerant manifold 50 (i.e., the penetration hole 30e, 30f) that is located peripherally in a connection part between the refrigerant manifold 50 (the penetration hole 30e, 30f) and the communication channel 24'. As seen looking in the direction of stacking of the cells 12, specifically, sectional configuration of the penetration hole 30e, 30f includes the plurality of protrusions 52, which protrude toward the center of the penetration hole 30e, 30f, on a part of the sectional configuration that corresponds to the periphery of the connection part between the refrigerant manifold 50 and the communication channel 24'.

In consideration of pressure loss of the refrigerant, the penetration holes 30e (30f) formed on the polymer electrolyte membrane 14 and the separators 22, 26 that constitute the refrigerant manifold 50 are preferably formed with identical sectional configurations so that the configurations coincide with one another as seen looking in the direction of stacking of the cells 12.

Description will be given on effects attained by such sectional configurations of the refrigerant manifolds 50 that include the plurality of protrusions 52 on the parts of the sectional configurations that correspond to the peripheries of the connection parts between the refrigerant manifolds 50 and the communication channels 24'.

Providing that attention is paid to one separator 26, for instance, in use of the sectional configurations of the refrigerant manifolds 50 that include the plurality of protrusions 52 on the parts of the sectional configurations that correspond to the peripheries of the connection parts between the refrigerant manifolds 50 and the communication channels 24', a current corrosion on the separator 26 commences from extremities of the protrusions 52. This occurs because current densities at the extremities of the protrusions 52 of the separator 26 are higher than current densities in other parts of the separator 26.

Figure 3:
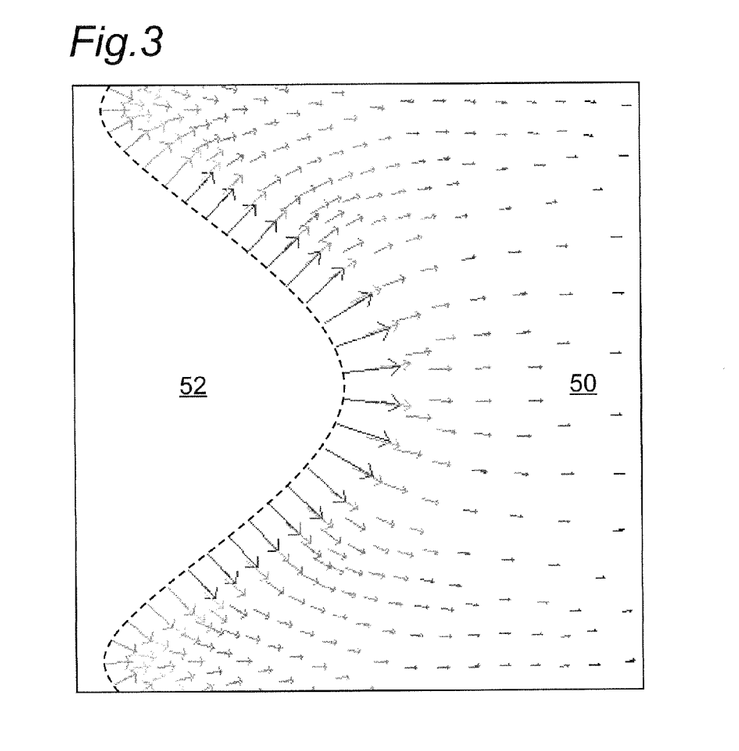
FIG. 3 is a representation showing current densities in the refrigerant in the refrigerant manifold.

FIG. 3 shows a result of electromagnetic field analysis for the refrigerant in the refrigerant manifold 50 with use of a finite element method software "ANSYS" produced by ANSYS, Inc. (details of the electromagnetic field analysis will be described later.) FIG. 3 expresses the current densities with use of vectors (arrows) and shows that the longer a vector, the higher the current density. A region that lacks depiction of the current density vectors corresponds to the protrusions 52.

As shown in FIG. 3, the current densities of the refrigerant increase with approach to a surface of the protrusions 52 of the separator 26 and with approach to the extremities of the protrusions 52. This shows that the current densities at the extremities of the protrusions 52 of the separator 26 are higher than the current densities in other parts of the separator 26.

At the extremities of the protrusions 52 of the separator 26 with high current densities, the current corrosion occurs more intensively than in other parts of the separator 26. In such other parts of the separator 26, by contrast, the current corrosion progresses more slowly than in the protrusions 52 because the currents concentrate in the protrusions 52.

From another point of view, as shown in FIG. 2A, the current corrosion intensively occurs at the extremities of the protrusions 52 that are distant from the seal member 34 and the progress of the current corrosion is retarded in parts of the separator 26 that are near to the seal member 34.

Therefore, the current corrosion can be suppressed in parts of the separators 22, 26 that are near to the seal member 34, providing that the sectional configurations of the refrigerant manifolds 50 include the plurality of protrusions 52 on the parts of the sectional configurations that correspond to the peripheries of the connection parts between the refrigerant manifolds 50 and the communication channels 24', that is, providing that the plurality of protrusions 52 are provided in the parts that are distant from the seal member 34, as shown in FIG. 2A. This suppresses a deterioration that may be caused by the current corrosion in parts of the separators 22, 26 that are in contact with the seal member 34 as shown in FIG. 2B. As a result, a deterioration in sealability between the seal member 34 and the separators 22, 26 can be suppressed. Similarly, a deterioration in sealability between the seal members 32 and the separators 22 can be suppressed.

The inventor conducted simulations for substantiating the above.

Figure 4A:
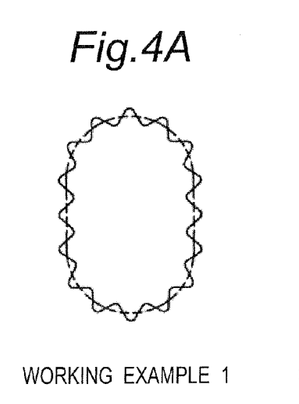
FIGS. 4A-4C are representations showing sectional configurations of refrigerant manifolds in working example 1, working example 2, and a comparative example.
Figure 4B:
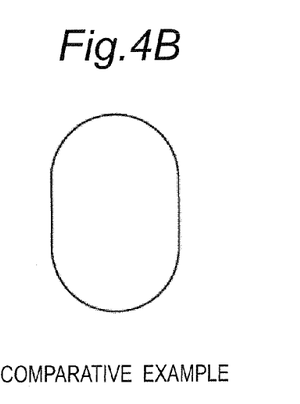
Figure 4C:
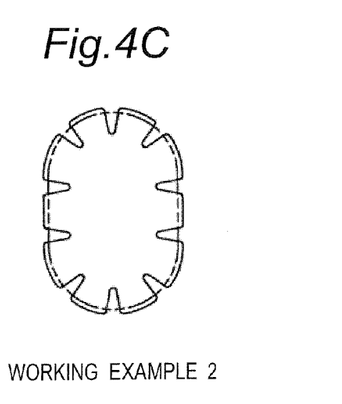

By the simulations, the inventor found out difference in the current density in the refrigerant that is caused by difference in configuration of the protrusions. FIGS. 4A-4C show sectional configurations of a plurality of refrigerant manifolds used in the simulations. FIG. 4A shows a sectional configuration of the refrigerant manifold 50 in a working example 1 of a polymer electrolyte fuel cell. FIG. 4B shows a sectional configuration of the refrigerant manifold 50 in a comparative example of a polymer electrolyte fuel cell. FIG. 4C shows a sectional configuration of the refrigerant manifold 50 in a working example 2 of a polymer electrolyte fuel cell. Chain double-dashed lines in FIGS. 4A and 4C show the sectional configuration of the refrigerant manifold 50 of the comparative example. The sectional configurations of the refrigerant manifolds 50 of the working example 1, the working example 2, and the comparative example have the same area.

Figure 5A:
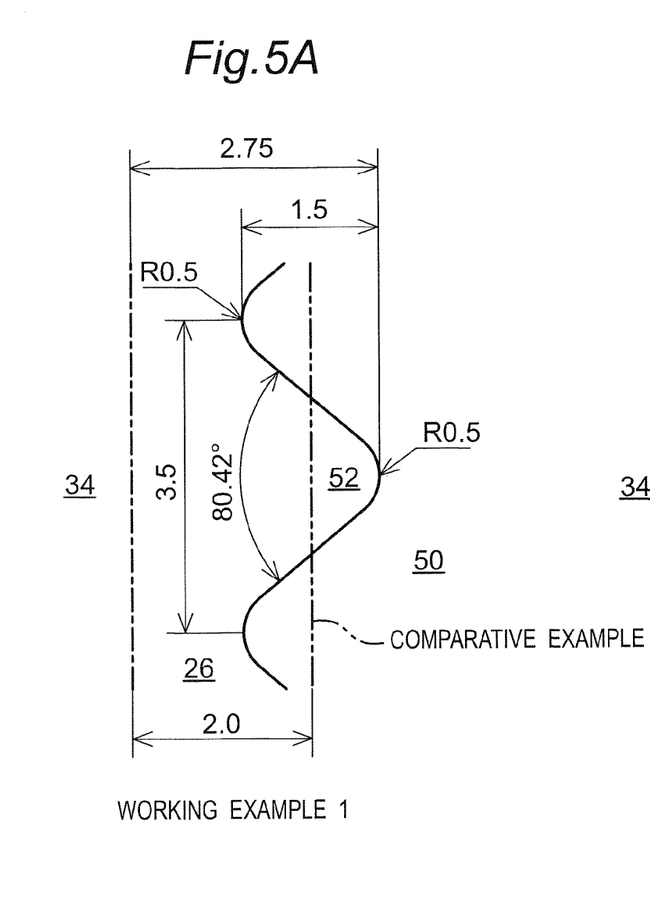
FIGS. 5A-5B are representations for illustration of details of the sectional configurations of the refrigerant manifolds in the working example 1 and the working example 2.
Figure 5B:
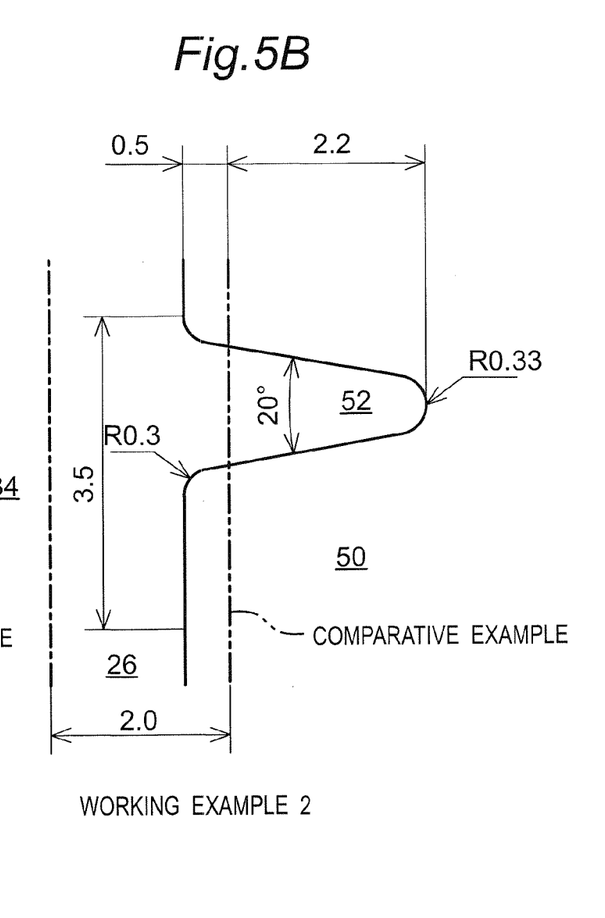

FIGS. 5A-5B are representations showing details of the sectional configurations of the refrigerant manifolds 50 of the working example 1 and the working example 2 in the simulations. Left sides of chain lines in FIGS. 5A-5B correspond to the seal member 34. Chain double-dashed lines therein show a portion of the sectional configuration of the refrigerant manifold 50 of the comparative example shown in FIG. 4B. In the working example 1, the working example 2, and the comparative example, distances from center of the refrigerant manifolds 50 to the seal member 34 are the same.

In the comparative example, as shown in FIGS. 4A-4C and 5A-5B, the sectional configuration of the manifold 50 is oval, and distance from the manifold 50 to the seal member 34 is 2.0 mm.

As shown in FIGS. 4A-4C, the plurality of protrusions 52 are more densely formed in the working example 1 than in the working example 2. As shown in FIGS. 5, R at the extremities of the protrusions 52 of the working example 1 is 0.5 and is made larger than that of 0.33 of the protrusions 52 of the working example 2. Point angle of the protrusions 52 of the working example 1 is 80.42° and is made larger than point angle of 20° of the protrusions 52 of the working example 2. Protruding length of the protrusions 52 of the working example is 1.5 mm and is made smaller than protruding length of 2.7 mm of the protrusions 52 of the working example 2.

Figure 6:
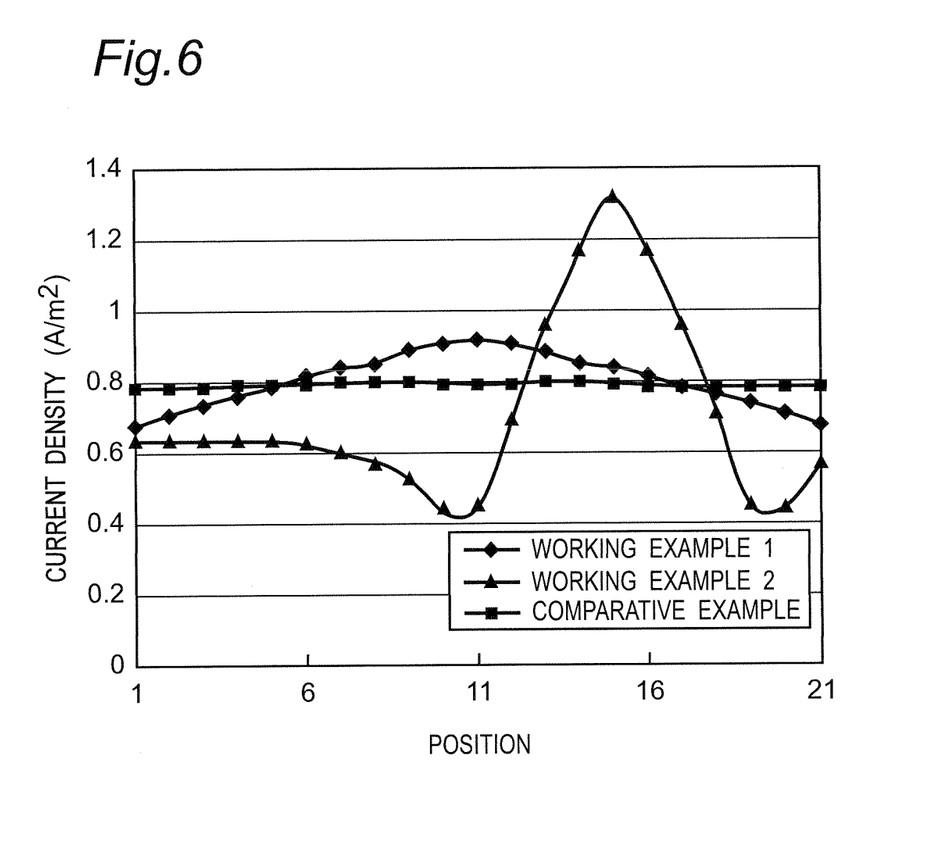
FIG. 6 is a representation showing current densities in a plurality of positions on an interface between a refrigerant and a separator in the working example 1, the working example 2, and the comparative example.
Figure 7A:
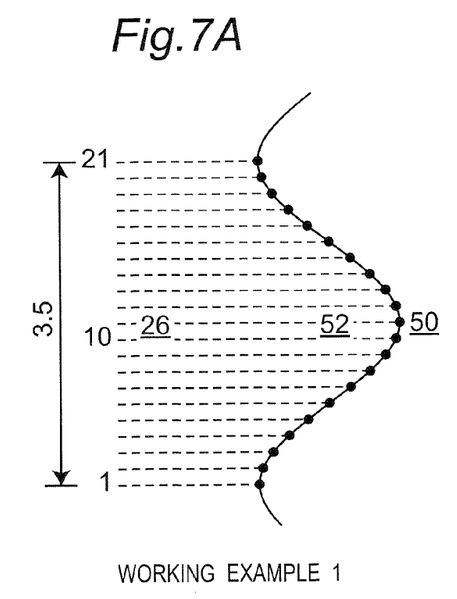
FIGS. 7A-7C are representations for illustration of the plurality of positions on the interface shown in FIG. 6.
Figure 7B:
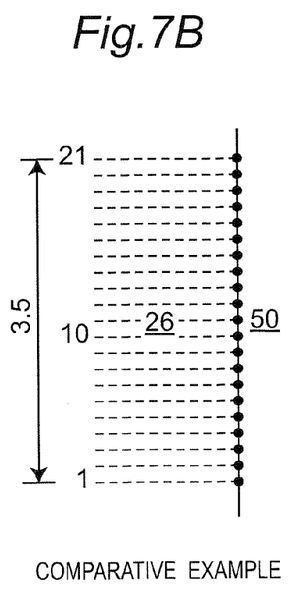
Figure 7C:
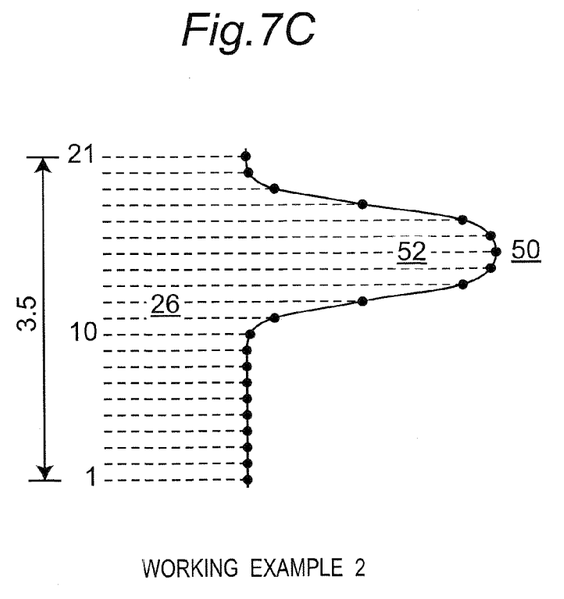

FIG. 6 shows current densities on an interface between the refrigerant in the refrigerant manifold 50 and the separator 26 in each of the working example 1, the working example 2, and the comparative example. Positions 1-21 shown on a horizontal axis in FIG. 6 designate positions on the interface between the refrigerant and the separator 26 as shown in FIGS. 7A-7C.

The current densities in the positions 1-21 on the interface between the refrigerant and the separator 26 are calculated with use of an electromagnetic field analysis module "ANSYS Emag" of the finite element method software "ANSYS" described above and produced by ANSYS, Inc. The module is capable of simulating low-frequency electric circuit and electric field of a system including conductors and capacities and magnetic field produced by currents or permanent magnets. The module includes comprehensive tool sets for static analysis, transient analysis and harmonic analysis of low-frequency electromagnetic field and is capable of performing simulations of electrostatic field, magnetostatic field, electromagnetic field, electric circuit and current conduction and simulations of charged particle tracing in electrostatic field and magnetostatic field.

The invention is for taking measures against the current corrosion on the separators that may be caused by the short circuit occurring through the refrigerant between two cells spaced apart from each other with at least one cell interposed therebetween, and thus an analytic model in which the refrigerant in the refrigerant manifold 50 composed of five layers was used for the working example 1, the working example 2, and the comparative example. That is, stacked five separators at different potentials were assumed.

Potential of 5V was set on boundary of a refrigerant layer at the highest potential side (boundary corresponding to the interface with the separator), potential of 4V set on boundary of a refrigerant layer at the second highest potential, potential of 3V set on boundary of a refrigerant layer at the third highest potential, potential of 2V set on boundary of a refrigerant layer at the fourth highest potential, and potential of 1V set on boundary of a refrigerant layer at the fifth, i.e., the lowest potential.

The electric conductivity of the refrigerant was set at 10 µS/cm.

FIG. 6 shows the current densities on the interface between the refrigerant layer at the highest potential and the separator.

In the working example 1 (rhombus plots), as shown in FIG. 6, the current density in the position 11 on the interface between the refrigerant and the separator 26 (position that is the nearest to the center of the refrigerant manifold 50) was about 0.9 A/m$^2$ and was higher by about 0.2 A/m$^2$ than that of about 0.7 A/m$^2$ in the positions 1 and 21 on the interface (positions that are the most distant from the center of the refrigerant supply manifold 50). As shown in FIG. 5A, namely, the current density in the far position 11 on the interface that is 2.75 mm distant from the seal member 34 was higher than that in the positions 1 and 21 on the interface that are 1.25 mm distant from the seal member 34. It is presumed that the difference in the current density causes the current corrosion to occur intensively in the parts of the separator 26 that correspond to the position 11 on the interface, i.e., at the extremities of the protrusions 52.

It is presumed as for the working example 1 that the current corrosion initially occurs at the extremities (position 11) of the protrusions 52 of the separator 26 and that thereafter the protrusions 52 gradually undergo the current corrosion from the extremities toward the seal member 34. It is also presumed that parts of the separator 26 that correspond to the positions 1 and 21 on the interface hardly undergo the current corrosion until the overall protrusions 52 sustain the current corrosion.

In the working example 2 (triangle plots), as shown in FIG. 6, the current density in the position 15 on the interface between the refrigerant and the separator 26 (position that was the nearest to the center of the refrigerant manifold 50) is about 1.3 A/m$^2$ and was higher by about 0.7 A/m$^2$ than the current densities of about 0.6 A/m$^2$ in the positions 1-9 and 21 on the interface (positions that are the most distant from the center of the refrigerant manifold 50). As shown in FIG. 5B, namely, the current density in the position 15 on the interface that is 4.2 mm distant from the seal member 34 was higher than the current densities in the positions 1-9 and 21 on the interface that are 1.5 mm distant from the seal member 34. It is presumed that the difference in the current density causes the current corrosion to occur intensively in the parts of the separator 26 that correspond to the position 15 on the interface, i.e., at the extremities of the protrusions 52.

The current density at the extremities of the protrusions 52 in the working example 2 was higher than the current density at the extremities of the protrusions 52 in the working example 1. As evident from comparison between FIG. 5A and FIG. 5B, it can be presumed that this is because R at the extremities of the protrusions 52 in the working example 2 is smaller than that in the working example 1, because the point angle of the protrusions 52 in the working example 2 is smaller than that in the working example 1, and because the extremities of the protrusions 52 in the working example 2 are nearer to the center of the refrigerant manifold 50 than those in the working example 1. It is therefore presumed that the current densities at the extremities of the protrusions 52 are increased providing that at least one of decreasing R at the extremities of the protrusions 52, decreasing the point angle of the protrusions 52, and making the extremities of the protrusions 52 closer to the center of the refrigerant manifold 50 is attained.

In the comparative example (square plots) as shown in FIG. 6, by contrast, the current densities in the positions 1-21 on the interface between the refrigerant and the separator 26 were about 0.8 A/m$^2$. There were no positions on the interface that had current densities higher than other positions on the interface as in the working example 1 and the working example 2. It is therefore presumed that the parts of the separator 26 which are in contact with the refrigerant uniformly undergo the current corrosion.

It is presumed from the working example 1, the working example 2, and the comparative example described above that the current corrosion can be suppressed in the parts of the separators 22, 26 that are near to the seal member 34, by the sectional configuration of the refrigerant manifold 50 provided with the plurality of protrusions 52 protruding toward the center of the manifold 50, on the part of the sectional configuration that is distant from the seal member 34 and that corresponds to the periphery of the connection part between the refrigerant manifold 50 and the communication channel 24'.

It is presumed that the current corrosion can more intensively be caused at the extremities of the protrusions 52 with decrease in R of the extremities of the protrusions 52 of the separators 22, 26, decrease in the angle thereof, and decrease in distance from positions thereof to the center of the refrigerant manifold 50 so that the current corrosion can further be suppressed in the parts of the separators 22, 26 that are near to the seal member 34.

The point angle of the protrusions 52 of the separators 22, 26 is preferred small from the point of view of the current corrosion, whereas the point angle is preferably in a range between 15 and 90 degrees in consideration of the feasibility of production, proneness to break and the like. The plurality of protrusions 52 are preferably provided in large number.

In the above embodiment, the current corrosion can intensively be caused at the extremities of the protrusions 52 by the sectional configuration of the refrigerant manifold 50 that includes the plurality of protrusions 52 protruding toward the center thereof on the part of the sectional configuration that corresponds to the periphery of the connection part between the refrigerant manifold 50 and the communication channel 24'. Thus the current corrosion in the parts of the separators 22, 26 that are near to the seal member 34 can be suppressed in comparison with that in the protrusions 52. This suppresses the deterioration in parts of the separators 22, 26 that are in contact with the seal members 32, 34 and suppresses the deterioration in sealability between the seal members 32, 34 and the separators 22, 26.

In addition, an efficiency of the refrigerant for heat recovery that is as high as that of conventional refrigerant manifolds lacking of a plurality of protrusions can be achieved, providing that the sectional configuration of the refrigerant manifold 50 includes the plurality of protrusions 52 protruding toward the center thereof on the part of the sectional configuration corresponding to the periphery of the connection part between the refrigerant manifold 50 and the communication channel 24' so that the sectional configuration has the same cross sectional area as the conventional refrigerant manifolds lacking the plurality of protrusions.

The invention has been described with reference to the embodiment described above; however, the invention is not limited to the embodiment.

In the embodiment, for instance, the sectional configurations of the refrigerant manifolds 50 (penetration holes 30e, 30f) includes the plurality of protrusions 52 only on the part of the sectional configuration that corresponds to the peripheries of the connection parts between the refrigerant manifolds 50 and the communication channels 24' as shown in FIG. 2A. Alternatively, the sectional configuration of the refrigerant manifolds may include the plurality of protrusions 52 provided thereon throughout all circumferences thereof. In the configuration provided with the plurality of protrusions 52 throughout all circumferences thereof, protrusions on the part of the sectional configuration that corresponds to the peripheries of the connection parts between the refrigerant manifolds 50 and the communication channels 24' may further protrude toward the center of the refrigerant manifolds in comparison with protrusions on other parts.

Though the refrigerant channel 24 is formed on the surface of the separator 26 facing the separator 22 in the above embodiment as shown in FIG. 1, there is no limitation thereto. The refrigerant channel 24 may be formed on a surface of the separator 22 opposed to the polymer electrolyte membrane 14. This makes the separator 26 unnecessary for configuration of the cell 12.

Figure 8:
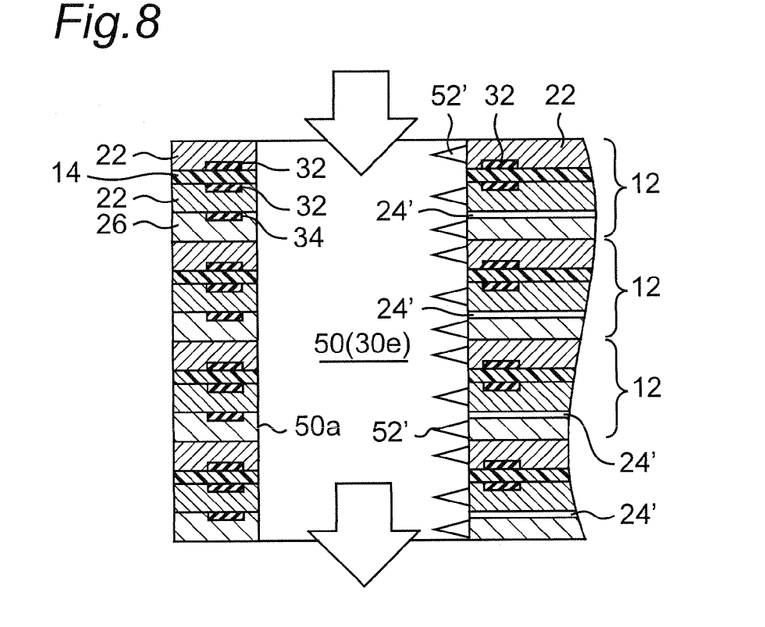
FIG. 8 is a representation showing a section of the refrigerant manifold provided with protrusions having a different shape.

Though the sectional configurations of the refrigerant manifolds 50 includes the plurality of protrusions 52 on the parts of the sectional configurations that corresponds to the peripheries of the connection parts between the refrigerant manifolds 50 and the communication channels 24' in the above embodiment, the invention is not limited thereto. As shown in FIG. 8, for instance, a plurality of conical or pyramidal protrusions 52' that protrude into the refrigerant manifolds 50 may be provided on the parts of the wall surfaces 50a of the refrigerant manifolds 50 (i.e., the penetration holes 30e, 30f) that are the peripheries of the connection parts between the refrigerant manifolds 50 and the communication channels 24'. That is, the protrusions of the invention have only to be protrusions that protrude into the refrigerant manifolds 50 from the parts of the wall surfaces 50a of the refrigerant manifolds 50 (i.e., the penetration holes 30e, 30f) that are located peripherally in the connection parts between the refrigerant manifolds 50 and the communication channels 24', in a broad sense. For this configuration, the sectional configurations of the refrigerant manifolds 50 may include the protrusions or the protrusions may stand on the wall surfaces 50a of the refrigerant manifolds 50.

The polymer electrolyte fuel cell in according to the invention can be used as a fuel cell for use in portable power source, power source for electric car, domestic cogeneration system or the like.

The invention claimed is:

1. A polymer electrolyte fuel cell comprising a plurality of stack cells each having an ionic conductive electrolyte membrane, an anode placed on one side of the electrolyte membrane, a cathode placed on the other side of the electrolyte membrane, and a conductive separator, the separator comprising:
    a center part located centrally in the conductive separator with respect to a plane of the separator extending perpendicularly to the direction of stacking of the plurality of cells;
    a first refrigerant channel for flow of a refrigerant that is formed in the center part of the separator;
    a refrigerant manifold which extends in the direction of stacking of the plurality of cells and through which the refrigerant flows, the refrigerant manifold located radially outward of the center part and the first refrigerant channel with respect to the plane of the separator;
    a second refrigerant channel that communicates between the refrigerant manifold and first refrigerant channel;
    a connection part between the refrigerant manifold and the second refrigerant channel; and
    a plurality of protrusions protruding into the refrigerant manifold from a part of the wall surface of the refrigerant manifold that is located peripherally at the connection part.

2. The polymer electrolyte fuel cell according to claim 1, wherein a sectional configuration of the refrigerant manifold of the separator that is orthogonal to the direction of stacking of the cells includes the plurality of protrusions on a part of the sectional configuration that corresponds to the periphery of the connection part between the refrigerant manifold and the second refrigerant channel.

3. The polymer electrolyte fuel cell according to claim 2, wherein the refrigerant manifold of the separators of the cells have identical sectional configurations that are orthogonal to the direction of stacking of the cells.

4. The polymer electrolyte fuel cell according to claim 1, wherein the plurality of protrusions are provided on the wall surface of the refrigerant manifold throughout all circumferences of the refrigerant manifold.

5. The polymer electrolyte fuel cell according to claim 4, wherein the amount of protrusion of the protrusions that protrude from the part of the wall surface of the refrigerant manifold that is located peripherally in the connection part for the second refrigerant channel exceeds the amount of protrusion of the protrusions that protrude from other parts of the wall surfaces of the refrigerant manifold.

* * * * *